United States Patent
Han et al.

(10) Patent No.: US 10,474,933 B2
(45) Date of Patent: Nov. 12, 2019

(54) RECOGNITION AND TRAINING METHOD AND APPARATUS

(71) Applicant: SAMSUNG ELECTRONICS CO., LTD., Suwon-si (KR)

(72) Inventors: Seungju Han, Seoul (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

(21) Appl. No.: 15/470,956

(22) Filed: Mar. 28, 2017

(65) Prior Publication Data

US 2018/0137395 A1    May 17, 2018

(30) Foreign Application Priority Data

Nov. 17, 2016   (KR) .................. 10-2016-0153539

(51) Int. Cl.
| | |
|---|---|
| G06K 9/66 | (2006.01) |
| G06K 9/00 | (2006.01) |
| G06K 9/46 | (2006.01) |
| G06K 9/62 | (2006.01) |
| G06N 3/04 | (2006.01) |
| G06N 3/08 | (2006.01) |

(52) U.S. Cl.
CPC ............ *G06K 9/66* (2013.01); *G06K 9/0061* (2013.01); *G06K 9/00067* (2013.01); *G06K 9/00087* (2013.01); *G06K 9/00268* (2013.01); *G06K 9/00288* (2013.01); *G06K 9/00617* (2013.01); *G06K 9/00926* (2013.01); *G06K 9/4628* (2013.01); *G06K 9/6223* (2013.01); *G06K 9/6257* (2013.01); *G06N 3/04* (2013.01); *G06N 3/08* (2013.01)

(58) Field of Classification Search
CPC .......... G06N 3/08; G06N 3/04; G06N 3/0454; G10L 15/063; G10L 17/04; G10L 17/26; G06K 9/4628; G06K 9/6223; G06K 9/66; G06K 9/00067; G06K 9/00087; G06K 9/00268; G06K 9/00288; G06K 9/0061; G06K 9/00617; G06K 9/00926; G06K 9/6257; G06K 9/6274
USPC ................................................. 382/118, 159
See application file for complete search history.

(56) References Cited

U.S. PATENT DOCUMENTS

| | | | |
|---|---|---|---|
| 9,704,054 B1 * | 7/2017 | Tappen | ..................... G06K 9/46 |
| 10,068,129 B2 * | 9/2018 | Brandt | ............... G06K 9/00295 |
| 2002/0103574 A1 * | 8/2002 | Funada | ............... G06K 9/00288 |
| | | | 700/245 |

(Continued)

FOREIGN PATENT DOCUMENTS

| | | |
|---|---|---|
| KR | 10-1087765 B1 | 11/2011 |
| KR | 10-2014-0067604 A | 6/2014 |
| KR | 10-2015-0054258 A | 5/2015 |

*Primary Examiner* — Daniel G Mariam
(74) *Attorney, Agent, or Firm* — NSIP Law

(57) ABSTRACT

Provided is an apparatus and method for data recognition and training. The training apparatus generates a recognition model by grouping training data, performing clustering after excluding representative information from the grouped training data, and grouping the clustered data into subgroups. The recognition apparatus identifies feature data and a cluster to which the feature data belongs from input data using a recognition model, and recognizes the input data based on the feature data and the cluster to which the feature data belongs.

31 Claims, 9 Drawing Sheets

(56) References Cited

U.S. PATENT DOCUMENTS

| | | | |
|---|---|---|---|
| 2006/0109148 A1* | 5/2006 | Yi | H03M 7/3088 341/50 |
| 2013/0050461 A1* | 2/2013 | Wada | G06K 9/00288 348/77 |
| 2015/0199560 A1 | 7/2015 | Gokturk et al. | |
| 2016/0071011 A1 | 3/2016 | Brand et al. | |
| 2016/0196469 A1 | 7/2016 | Wabgaonkar et al. | |

* cited by examiner

RECOGNITION AND TRAINING METHOD AND APPARATUS

CROSS-REFERENCE TO RELATED APPLICATION

This application claims the benefit under 35 USC § 119(a) of Korean Patent Application No. 10-2016-0153539 filed on Nov. 17, 2016, in the Korean Intellectual Property Office, the entire disclosure of which is incorporated herein by reference for all purposes.

BACKGROUND

1. Field

The following description relates to machine recognition, training, and recognition and training methods and apparatuses.

2. Description of Related Art

Recently, there has been research on efficient machine pattern recognition methods and apparatuses. One such area of research is focused on computing devices configured as artificial neural networks. Through unique or individual internal defined sharing and computational restrictions, activations, and weightings, the artificial neural network may generate mappings between input patterns and output patterns. An operation of causing the neural network to generate or have such mappings, and thus have such unique or individual structures, is referred to as learning or training the artificial neural network. Based on a result of the learning, some trained artificial neural networks may generate outputs with respect to new input patterns.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor implemented recognition method including calculating feature data corresponding to input data from the input data based on a recognition model, and identifying a cluster to which the input data belongs, and recognizing the input data based on the feature data and the cluster to which the input data belongs.

The input data may be image data of a face, an iris, or a fingerprint, and the recognizing of the input may include one or more of probabilistically identifying the input data from among registered information and/or verifying whether the input data corresponds to the registered information.

The identifying of the cluster may include at least one of determining a cluster corresponding to a pose of the object, among clusters corresponding to a plurality of object poses, and determining a cluster corresponding to an ambient environment of the object, among clusters corresponding to a plurality of ambient environments.

The method may further include training the recognition model by grouping training data into a plurality of groups, the respective groups representing different IDs, excluding ID group representative information from group data belonging to each of the plurality of groups, clustering the group data from which the ID group representative information is excluded into a plurality of clusters, and grouping cluster data belonging to each of the plurality of clusters into a plurality of sub-groups, respective subgroups of the plurality of sub-groups corresponding to the different IDs.

The recognition model may be a recognition model neural network, and the grouping of the training data may train, with supervision, a first model into the recognition model neural network, the clustering of the group data may train, without supervision, a second model into the recognition model neural network, and the grouping of the cluster data may train, with supervision, a third model into the recognition model neural network.

The recognizing may include verifying whether the input data matches data to be verified in response to the cluster to which the input data belongs being a same cluster as a cluster to which the data to be verified belongs.

The recognizing may include verifying whether the input data matches data to be verified based on threshold information designated for a corresponding cluster in response to the cluster to which the input data belongs being the same as a cluster to which the data to be verified belongs.

The recognizing may include verifying whether the input data matches registered data based on cluster information of the cluster to which the input data belongs and cluster information of a cluster to which data to be verified belongs in response to the cluster to which the input data belongs being different from the cluster to which the data to be verified belongs.

The recognizing may include verifying whether the input data matches data to be verified based on threshold information designated for a cluster to which the data to be verified belongs in response to the cluster to which the input data belongs being different from the cluster to which the data to be verified belongs.

The recognizing may include identifying registered data matching the input data, among a plurality of items of registered data, based on the cluster to which the input data belongs and a cluster to which each of the plurality of items of registered data belongs.

The identifying may include sequentially selecting data to be identified from the plurality of items of registered data, and calculating a similarity between the feature data corresponding to the input data and the data to be identified in response to the cluster to which the input data belongs being a same cluster as a cluster to which the data to be identified belongs.

The identifying may include sequentially selecting data to be identified from the plurality of items of registered data, and calculating a similarity between the feature data corresponding to the input data and the data to be identified based on cluster information of the cluster to which the input data belongs and cluster information of a cluster to which the data to be identified belongs in response to the cluster to which the input data belongs being different from the cluster to which the data to be identified belongs.

The recognition method may further include storing cluster information for each of a plurality of clusters.

In another general aspect, there is also provided a non-transitory computer-readable medium storing instructions, that when executed by a processor, cause the processor to perform one or more or all training and recognition processes described herein.

In another general aspect, there is also provided a processor implemented training method to train a recognition model including grouping training data into a plurality of groups, excluding group representative information from group data belonging to each of the plurality of groups, clustering the group data from which the group representative information is excluded into a plurality of clusters, and grouping cluster data belonging to each of the plurality of clusters into a plurality of sub-groups to train the recognition model.

The recognition model may be a recognition model neural network, and the grouping of the training data may train, with supervision, a first model into the recognition model neural network, the clustering of the group data may train, without supervision, a second model into the recognition model neural network, and the grouping of the cluster data may train, with supervision, a third model into the recognition model neural network.

The grouping of the training data may include grouping feature data calculated from a plurality of training inputs to which the same training output is mapped as a group corresponding to the training output, among the plurality of groups.

The grouping of the training data may include grouping a feature vector by training a first model to reduce an error between an output corresponding to the feature vector and a training output corresponding to a training input of the training data, the feature vector calculated using the first model from the training input.

The excluding may include calculating the group representative information for each of the plurality of groups, and subtracting the group representative information from the group data belonging to each of the plurality of groups.

The clustering may include calculating cluster information for each of the plurality of clusters, and mapping the cluster information to a corresponding cluster and storing the cluster information.

The clustering may include clustering the group data into the plurality of clusters by training a second model to reduce a cost calculated using the second model from the group data from which the group representative information is excluded.

The grouping of the cluster data may include grouping the cluster data into the plurality of sub-groups by training a third model to reduce an error between an output calculated using the third model from the cluster data belonging to each of the plurality of clusters and a training output corresponding to the cluster data.

The training method may further include determining threshold information for each of the plurality of clusters.

The determining may include calculating a first similarity distribution between feature data belonging to a first sub-group within one of the plurality of clusters, calculating a second similarity distribution between the feature data belonging to the first sub-group and feature data belonging to a second sub-group distinct from the first sub-group within a corresponding cluster, and determining the threshold information for the corresponding cluster based on the first similarity distribution and the second similarity distribution.

The plurality of groups may respectively correspond to different IDs, the excluded group representative information may correspond to respective ID information of each group data and may be excluded from consideration during the clustering of the group data, and the grouping of the cluster data may include consideration of the respective ID information when grouping the cluster data so as to form sub-groups within each cluster.

The method may further include recognizing input data based on calculated feature data corresponding to the input data using the trained recognition model and an identifying of a cluster to which the input data belongs.

In still another general aspect, there is also provided a recognition apparatus including a memory configured to store a recognition model, and a processor configured to calculate feature data corresponding to input data from the input data based on the recognition model, identify a cluster to which the input data belongs, and recognize the input data based on the feature data and the cluster to which the input data belongs.

The processor may be further configured to train the recognition model using training data corresponding to registration data.

The recognition model may be a recognition model neural network, the recognition model neural network may have been trained according to a grouping of training data into a plurality of groups to train, with supervision, a first model into the recognition model neural network, a clustering of group data belonging to each of the plurality of groups to train, without supervision, a second model into the recognition model neural network, and a grouping of cluster data belonging to each of the plurality of clusters into a plurality of sub-groups to train, with supervision, a third model into the recognition model neural network.

In a further general aspect, there is also provided a processor implemented recognition method including calculating feature data corresponding to an input image including an object based on a recognition model from the input image, identifying a cluster to which the object included in the input image belongs based on the feature data, and recognizing the object based on the feature data and the cluster.

The identifying may include determining a cluster corresponding to a pose of the object, among clusters corresponding to a plurality of object poses, based on the feature data.

The identifying may include determining a cluster corresponding to an ambient environment of the object, among clusters corresponding to a plurality of ambient environments, based on the feature data.

The recognizing may include recognizing a registered image matching the input image within the identified cluster.

The recognition method may further include mapping a cluster to which a registered image corresponding to a registered user belongs to the registered image and storing the cluster to which the registered image belongs, and generating and storing a virtual registered image corresponding to at least one of remaining clusters excluding the cluster to which the registered image belongs.

Other features and aspects will be apparent from the following detailed description, the drawings, and the claims.

Figure 1:
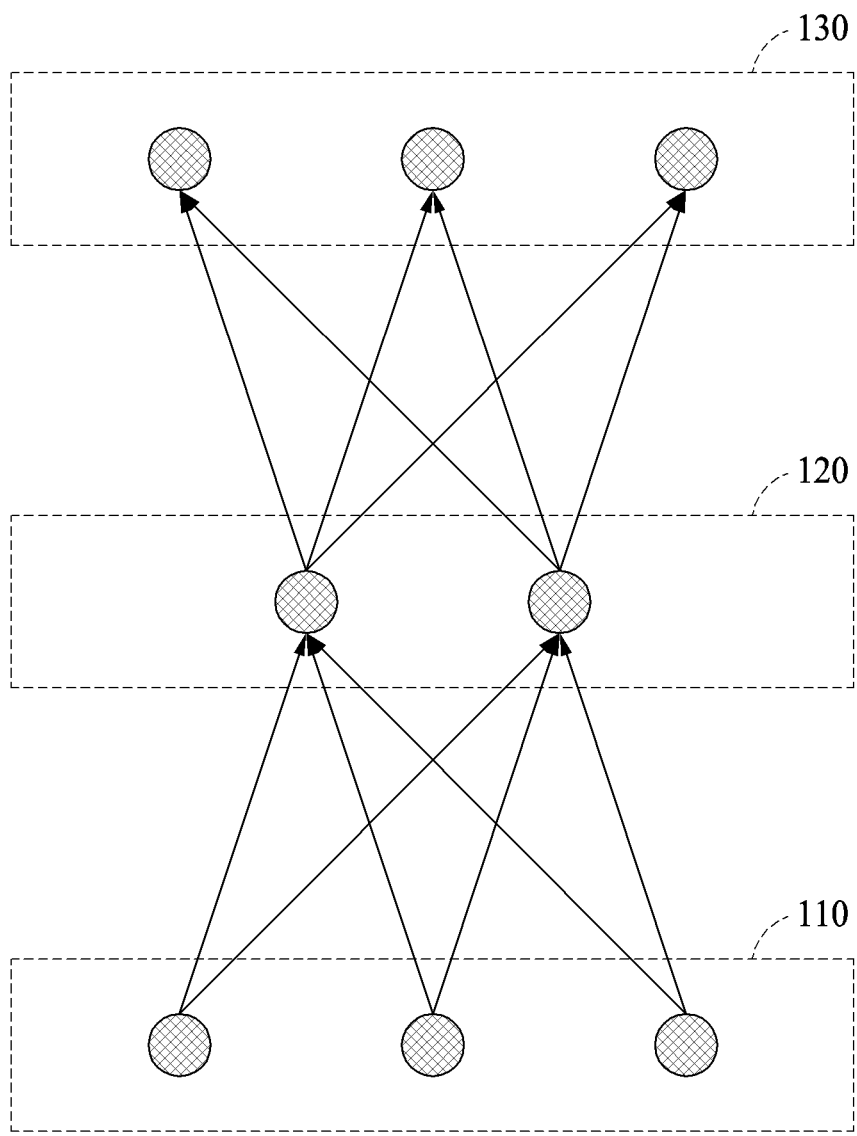
FIG. 1 is a diagram illustrating an example of a neural network in accordance with an embodiment.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which this disclosure pertains consistent with and after an understanding of the present disclosure. It will be further understood that terms, such as those defined in commonly-used dictionaries, should be interpreted as having a meaning that is consistent with their meaning in the context of the relevant art and the present disclosure and will not be interpreted in an idealized or overly formal sense unless expressly so defined herein.

When describing the examples with reference to the accompanying drawings, like reference numerals refer to like constituent elements and a repeated description related thereto will be omitted.

FIG. 1 is a diagram illustrating an example of a neural network in accordance with an embodiment.

A recognition apparatus in accordance with an embodiment calculates a recognition result with respect to input data and a cluster to which the input data belongs from the input data using a recognition model. A training apparatus trains the recognition model to output information indicating or suggesting the cluster to which the training input belongs and a training output from the training input.

For example, the recognition model includes at least one neural network 100. A method of performing recognition based on the neural network 100, a recognition apparatus configured to perform recognition using the neural network 100, a method of training the neural network 100, a training apparatus configured to train the neural network 100, a method of training the neural network 100 and performing recognition based on the trained neural network 100, and such a recognition or training apparatus further configured to train the neural network and perform recognition using the trained neural network 100, are set forth herein. Herein, recognition includes verification and identification. Verification is an operation of determining whether input data is true or false, and identification is an operation of determining a label indicated by input data, among a plurality of labels. As only an example, a label may be an identification (ID) of a human, such that a verification may include determining whether an object from an input image has an ID that matches one of multiple previously registered IDs, while identification may include identifying, e.g., indicated through an output probability, the ID of the object from such previously registered IDs. Thus, in this example and according to one or more embodiments, a recognition operation may include using a trained recognition model for implementing the verification and/or identification of input object information, e.g., previously unlabeled input object information. An apparatus according to one or more embodiments may include both or only one of capabilities and corresponding configuration to train such a recognition model in a training operation and use the trained recognition model in a recognition operation.

A structure of the neural network 100 will be described below in advance of describing recognition.

The neural network 100 includes a plurality of layers, each including a plurality of nodes. The neural network 100 includes respective connection weights applied to the connections between one or more nodes included in each of the plurality of layers and an example node included in another layer. The training apparatus obtains the neural network 100 from an internal database stored in a memory, or receives the neural network 100 from an external server through a communicator.

For example, the neural network 100 is a recognition model that uses a large number of artificial nodes or neurons connected through edges. The neural network 100 is implemented by hardware, such as solely through hardware, solely through processor executed instructions stored on a non-transitory computer readable medium, or a combination thereof. The neural network 100 may also be referred to as an artificial neural network.

The neural network 100 uses artificial neurons or nodes that are configured differently than biological neurons by being connected to each other through edges having connection weights. The connection weights are predetermined values of the edges, e.g., set during training, and may also be referred to as synapse weights or connection strengths.

The neural network 100 includes a plurality of layers. For example, the neural network 100 includes an input layer 110, a hidden layer 120, and an output layer 130. The input layer 110 receives an input through the illustrated example three nodes, which may be used to perform training or recognition and which transmit the corresponding input to one or more of the illustrated example nodes of the hidden layer 120. The output layer 130 generates an output of the neural network 100 through the illustrated example three nodes based on signals received from the hidden layer 120. The hidden layer 120 is disposed between the input layer 110 and the output layer 130.

For example, during training, the hidden layer 120 may operate on a training input of training data received from the input layer 110 to output an expected or easily predictable value. Herein, the training data may be a data set including a plurality of training pairs. For example, a training pair includes a training input and a training output, and the training output may be a value to be output from the training input paired with the training output. Thus, the training data includes a plurality of training inputs, and training outputs mapped to the plurality of training inputs, respectively. When the input and output pair are known, the corresponding training may be called supervised training.

As noted, the input layer 110, the hidden layer 120, and the output layer 130 each include a plurality of nodes. The nodes included in the input layer 110 may be referred to as input nodes, the nodes included in the hidden layer 120 may be referred to as hidden nodes, and the nodes included in the output layer 130 may be referred to as output nodes.

The input nodes included in the input layer 110 and the hidden nodes included in the hidden layer 120 are connected to each other through edges having connection weights. The hidden nodes included in the hidden layer 120 and the output nodes included in the output layer 130 are also connected to each other through edges having connection weights.

The hidden layer 120 of the neural network 100 may represent a plurality of hidden layers, in which case the neural network 100 including the plurality of hidden layers may be referred to as a deep neural network. Training the deep neural network may be referred to as deep learning. Assuming that the illustrated hidden layer 120 represents a first hidden layer, a second hidden layer, and a third hidden layer, an output of a hidden node included in the first hidden layer may be connected to hidden nodes belonging to the second hidden layer. An output of a hidden node belonging to the second hidden layer may be connected to hidden nodes belonging to the third hidden layer.

For example, the training apparatus and the recognition apparatus input outputs of previous hidden nodes included in a previous hidden layer into each subsequent hidden layer, for example, through edges having connection weights, and generate outputs of hidden nodes included in a hidden layer based on values obtained by applying the respective connection weights to the outputs of the previous hidden nodes and corresponding activation functions of the respective nodes. For example, to fire or produce an output to a next hidden node, a result of the corresponding activation function of a current hidden node may need to exceed a threshold of the current hidden node. In this example, a node maintains a deactivated state without firing a signal to a next node until a predetermined threshold strength of activation is reached through input vectors.

The training apparatus trains at least a portion of the neural network 100 through supervised learning. The training apparatus is implemented by hardware, such as solely through hardware, solely through processor executed instructions stored on a non-transitory computer readable medium, or a combination thereof. Supervised learning refers to a method of inputting a training input of training data for a corresponding training output into the neural network 100, and updating connection weights of edges so that output data corresponding to the training output of the training data may be output correctly.

The training apparatus also trains at least a portion of the neural network 100 through unsupervised learning. For example, unsupervised learning may refer to a method of calculating a loss, for example, an entropy loss, based on an output obtained by forward propagating a training input of training data, and updating connection weights of edges so that the loss may decreases. The unsupervised learning may represent learning without labels, for example.

Although FIG. 1 illustrates the structure of the neural network as a structure of nodes, examples are not limited thereto. Various data structures may be used to store the neural network in a memory storage of the training apparatus and recognition apparatus.

During training, the training apparatus may determine respective parameters of the nodes through a gradient descent scheme which is based on a loss to be back-propagated to the neural network and output values of the nodes included in the neural network. For example, the training apparatus may update the connection weights among the nodes through loss back-propagation learning. Loss back-propagation learning refers to a method of estimating a loss with respect to provided training data through forward computation, and updating connection weights to reduce the loss while propagating the estimated loss in a backward direction from the output layer 130 toward the hidden layer 120 and the input layer 110. Processing of the neural network 100 is performed in an order of the input layer 110, the hidden layer(s) 120, and the output layer 130. However, in the loss back-propagation learning, the connection weights are updated in an order of the output layer 130, the hidden layer 120, and the input layer 110. To process the neural network as desired, one or more processors may use a buffer memory configured to store layers or a series of computed data.

For the training, the training apparatus may define an objective function to be used to measure optimalities of currently set connection weights, continuously change the connection weights based on a result of the objective function, and iteratively perform training. For example, the objective function may be a loss function to be used by the neural network 100 to calculate a loss between an actual output value and a value expected to be output with respect to a training input of training data. In the training, the training apparatus may update the connection weights to reduce a value of the loss function.

Figure 2:
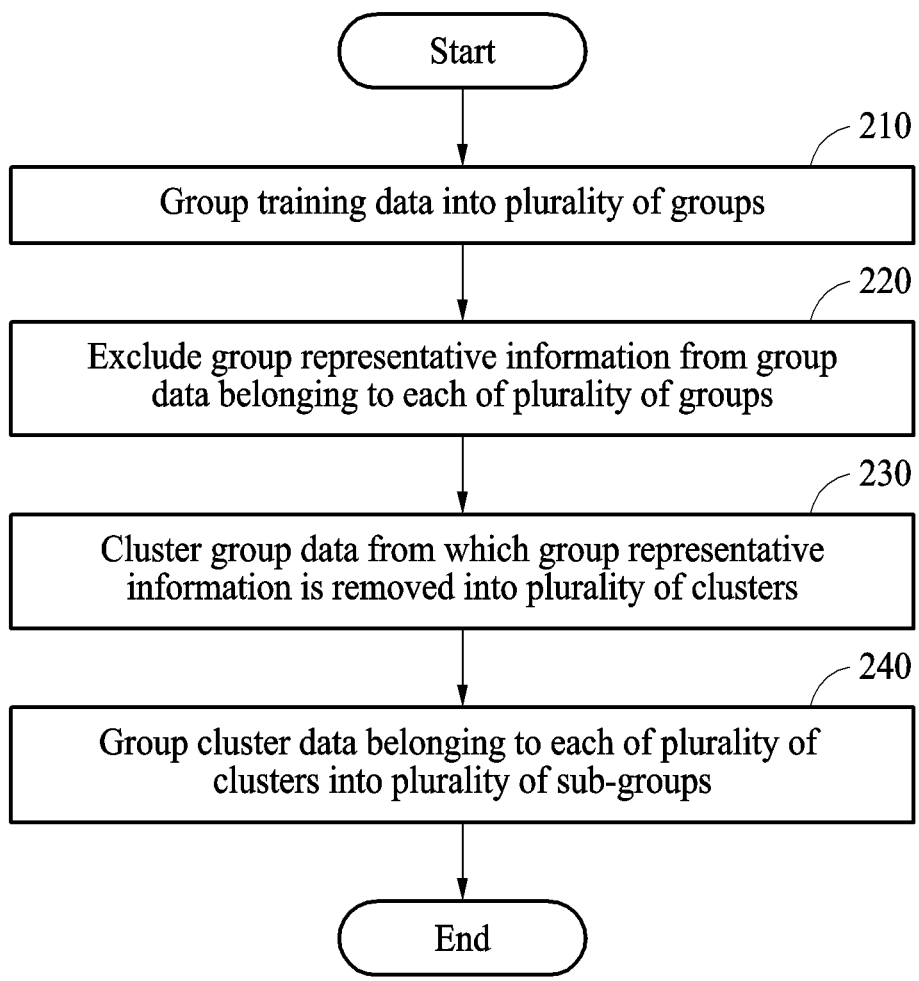
FIG. 2 is a flowchart illustrating an example of a training method in accordance with an embodiment.

FIG. 2 is a flowchart illustrating an example of a training method in accordance with an embodiment.

Referring to FIG. 2, in operation 210, a training apparatus groups training data into a plurality of groups. The training apparatus groups feature data calculated based on a first model from a training input by training the first model. Each of the plurality of groups corresponds to a single label, for example, identification (ID) information. For example, in a case in which the training data is data associated with N IDs, each of the plurality of groups corresponds to a single ID. Here, N is an integer greater than or equal to "1". Further, the training output of the training data is a label indicating one of the N IDs. The training apparatus classifies the feature data calculated using the first model from the training input as a group corresponding to one of the N IDs.

In operation 220, the training apparatus excludes group representative information from group data belonging to each of the plurality of groups. The group representative information is information that represents each of the groups generated in operation 210. The training apparatus subtracts the group representative information of each group from feature data belonging to the corresponding group.

For example, the group representative information may be a statistic value with respect to feature data included in each group. The group representative information may be a mean value vector of the feature data. For example, an i-th element of a mean value vector with respect to a predetermined group is calculated based on a mean value of i-th elements of respective feature vectors included in the corresponding group. The feature data and the mean value vector are m-dimensional feature vectors. Here, i is an integer greater than or equal to "1" and less than or equal to m, and m is an integer greater than or equal to "1".

In operation 230, the training apparatus clusters the group data from which the group representative information is removed into a plurality of clusters. The training apparatus classifies each item of the group data from which the group representative information is excluded as one of the plurality of clusters by training a second model. Each of the plurality of clusters includes data having a common trait. For example, in a case in which the training data includes images of objects, the plurality of clusters are classified into a cluster including images captured under a predetermined lighting environment, and a cluster including images in which an object has a predetermined pose. However, the training apparatus automatically clusters the group data from which the group representative information is removed, by training the second model through unsupervised learning without a necessity for designating a trait for each cluster in advance.

Herein, a cluster is a set of provided feature data clustering close together in a feature space. Clustering is an operation of processing feature data to form each cluster.

In operation 240, the training apparatus groups cluster data belonging to each of the plurality of clusters into a plurality of sub-groups. The training apparatus classifies the cluster data belonging to each cluster as one of the plurality of sub-groups by training a third model. Each of the plurality of sub-groups corresponds to a single label. Thus, sub-group data belonging to a plurality of sub-groups belonging to a single cluster have a common trait, and sub-group data belonging to each sub-group have a common trait and a common label.

Figure 3:
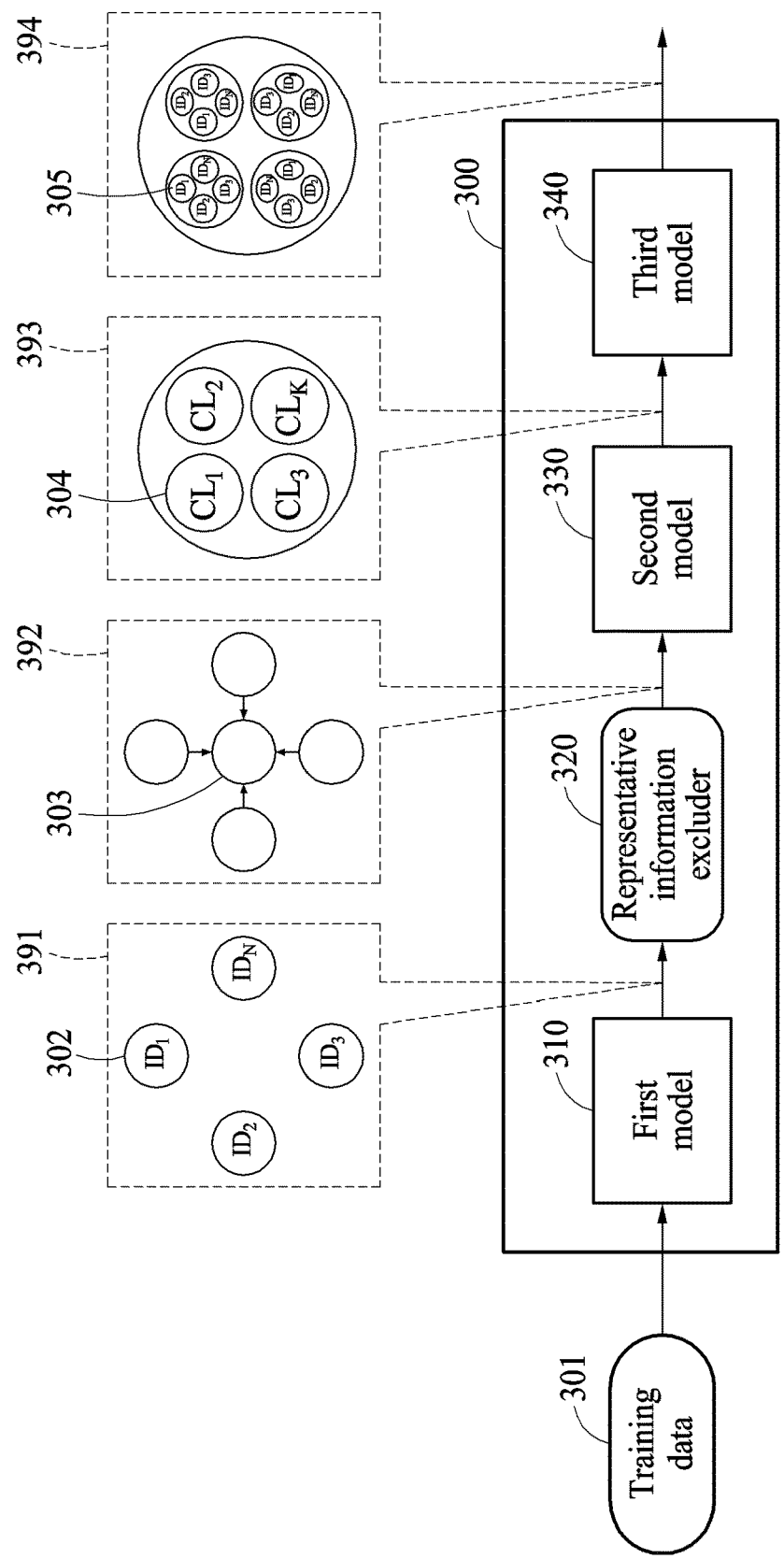
FIG. 3 is a diagram illustrating an example of a recognition model and a feature space in accordance with an embodiment.

FIG. 3 is a diagram illustrating an example of a recognition model and a feature space in accordance with an embodiment.

A training apparatus trains a recognition model 300 based on training data 301. The recognition model 300 includes a first model 310, a representative information excluder 320, a second model 330, and a third model 340. The first model 310, the second model 330, and the third model 340 are configured as at least a portion of the neural network 100 of FIG. 1. The training apparatus trains the first model 310 and the third model 340 through supervised learning, and trains the second model 330 through unsupervised learning. The representative information excluder 320 is configured to exclude group representative information from a value output from the first model 310.

The training apparatus trains the first model 310, the second model 330, and the third model 340 sequentially and separately.

The training apparatus groups feature data calculated from a plurality of training inputs to which the same training output is mapped as a group corresponding to the training output, among the plurality of groups. For example, the training apparatus groups a feature vector calculated using the first model 310 from a training input of the training data 301 by training the first model 310 to reduce an error between an output corresponding to the feature vector and a training output corresponding to the training input. The training apparatus calculates the feature vector using the first model 310 from the training input of the training data 301, and calculates a loss, for example, a Softmax loss or a triplet loss, based on the calculated feature vector and the training output. The feature data is classified into groups 302 within a feature space 391.

The training apparatus calculates group representative information for each of the plurality of groups 302. The training apparatus subtracts the group representative information from group data belonging to each of the plurality of groups 302. Thus, the training apparatus subtracts the group representative information of the corresponding group, for example, a mean value of the corresponding group 302, from the group data belonging to each group 302 through the representative information excluder 320, thereby combining group data belonging to groups corresponding to all labels in a central space 303 of a feature space 392, as shown in the feature space 392. A label attribute, for example, an ID attribute, is removed from the group data belonging to each group. Thus, the group data from which the group representative information is excluded has features of remaining attributes, for example, an environment and a pose of an object, excluding the label attribute.

The training apparatus clusters the group data from which the group representative information is excluded into a plurality of clusters. The training apparatus calculates cluster information for each of the plurality of clusters. The training apparatus maps the cluster information to the corresponding cluster and stores the cluster information. For example, the training apparatus clusters the group data into a plurality of clusters by training the second model 330 to reduce a cost calculated using the second model 330 from the group data from which the group representative information is excluded.

The cluster information is information that represents a cluster. For example, the cluster information may be a statistic value with respect to feature data included in each cluster. The cluster information may be a mean value vector of the feature data. A j-th element of a mean value vector with respect to a predetermined cluster may be calculated based on a mean value of j-th elements of respective feature vectors included in the corresponding group.

As shown in a feature space 393, the group data is classified into clusters 304. The clusters 304 have a trait corresponding to an environment effect, a trait corresponding to an object pose, and a trait corresponding to a complex element in common. For example, a first cluster includes feature data related to an image affected by low luminance, a second cluster includes feature data related to a side face image, and a third cluster includes feature data related to a low-luminance side face image. Further, FIG. 3 illustrates K clusters, K being an integer greater than or equal to "1".

However, the number of clusters is predetermined, or determined based on a clustering method.

The training apparatus groups cluster data belonging to each cluster into a plurality of sub-groups. The training apparatus groups the cluster data into the plurality of sub-groups by training the third model 340 to reduce an error between an output calculated using the third model 340 from the cluster data belonging to each of the plurality of clusters and a training output corresponding to the cluster data. As shown in a feature space 394, each item of data is classified as a sub-group 305 of a unit of label within the cluster.

Figure 4:
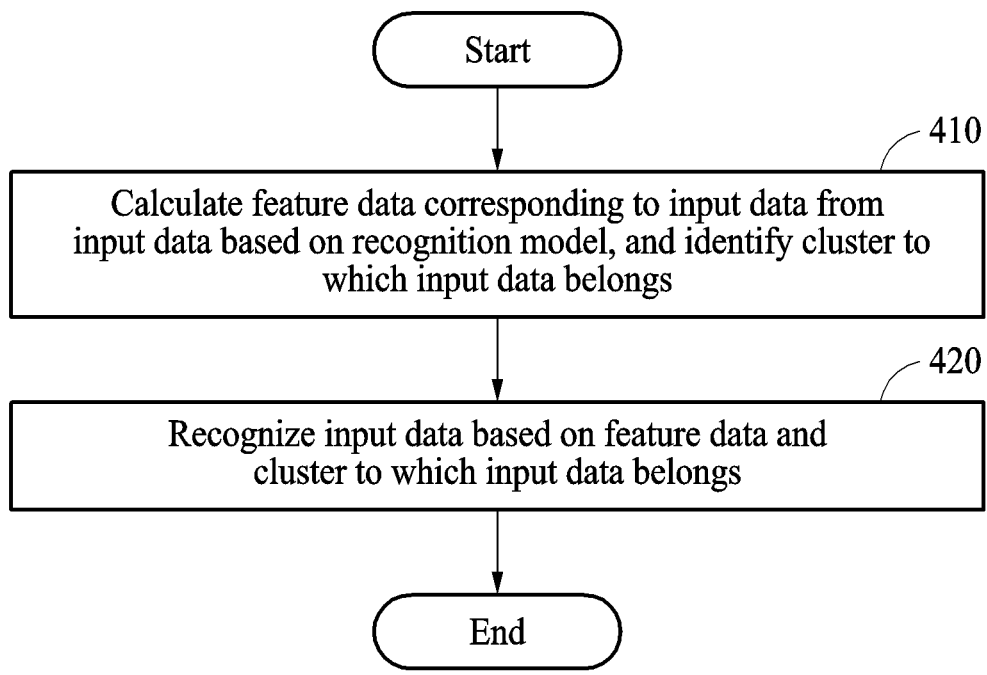
FIGS. 4 and 5 are flowcharts illustrating an example of a recognition method in accordance with an embodiment.
Figure 5:
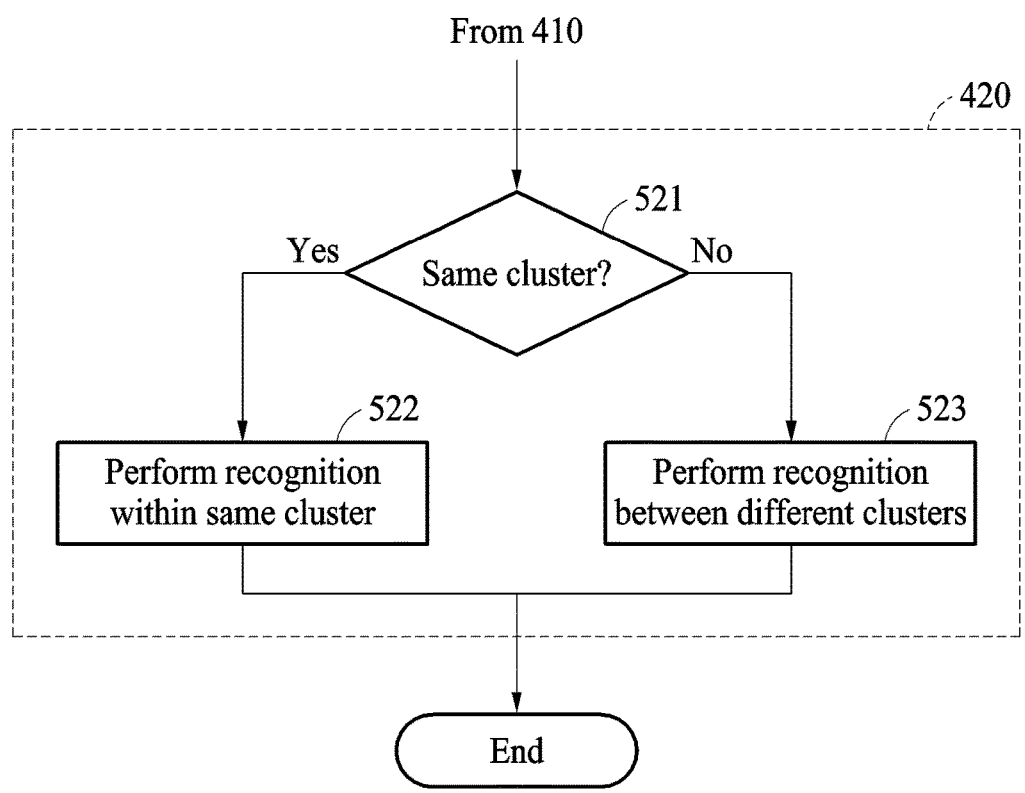

FIGS. 4 and 5 are flowcharts illustrating an example of a recognition method in accordance with an embodiment.

Referring to FIG. 4, in operation 410, a recognition apparatus calculates feature data corresponding to input data from the input data based on a recognition model, and identifies a cluster to which the input data belongs. As described above with reference to FIGS. 1 through 3, the recognition model is a model trained to output feature data and a cluster to which a provided input belongs with respect to the input based on training data.

In operation 420, the recognition apparatus recognizes the input data based on the feature data and the cluster to which the input data belongs. The recognition apparatus identifies one item of registered data matching the input data, or verifies whether the input data matches provided data to be verified. For example, the recognition apparatus determines whether the feature data corresponding to the input data, the feature data calculated using the recognition model, matches registered data or data to be verified.

Referring to FIG. 5, in operation 521, the recognition apparatus determines whether the input data and target data belong to the same cluster. In a case in which the recognition apparatus performs identification, the target data is one item of registered data. In a case in which the recognition apparatus performs verification, the target data is provided data to be verified.

In operation 522, the recognition apparatus performs recognition within the same cluster in response to determination that the input data and the target data belong to the same cluster.

The recognition apparatus identifies registered data matching the input data, among a plurality of items of registered data, based on a cluster to which each of the plurality of items of registered data belongs and the cluster to which the input data belongs. The recognition apparatus sequentially selects data to be identified from the plurality of items of registered data. In response to the cluster to which the input data belongs being the same as a cluster to which the data to be identified belongs, the recognition apparatus calculates a similarity between the feature data corresponding to the input data and the data to be identified. In response to the similarity exceeding threshold information, the recognition apparatus determines that the input data matches the data to be identified. The threshold information will be described further with reference to FIG. 7.

Herein, in a case in which the feature data and the data to be identified are m-dimensional feature vectors, the similarity may be a Euclidean distance between the two feature vectors. However, the similarity is not limited thereto, and various equations may be used according to a design.

In another example, in response to the cluster to which the input data belongs being the same as the cluster to which the data to be verified belongs, the recognition apparatus verifies whether the input data matches the data to be verified. In response to the cluster to which the input data belongs being the same as the cluster to which the data to be verified belongs, the recognition apparatus verifies whether the input data matches the data to be verified based on threshold information designated for the corresponding cluster.

In operation 523, the recognition apparatus performs recognition between different clusters in response to determination that the input data and the target data belong to the different clusters.

In response to the cluster to which the input data belongs being different from the cluster to which the data to be identified belongs, the recognition apparatus calculates a similarity between the feature data corresponding to the input data and the data to be identified based on cluster information of the cluster to which the input data belongs and cluster information of the cluster to which the data to be identified belongs. The recognition apparatus determines that the input data matches the data to be identified in responses to the similarity exceeding threshold information designated for the cluster to which the data to be identified belongs. The threshold information will be described with reference to FIG. 7.

In another example, in response to the cluster to which the input data belongs being different from the cluster to which the data to be verified belongs, the recognition apparatus verifies whether the input data matches registered data based on the cluster information of the cluster to which the input data belongs and the cluster information of the cluster to which the data to be verified belongs. In response to the cluster to which the input data belongs being different from the cluster to which the data to be verified belongs, the recognition apparatus verifies whether the input data matches the data to be verified based on threshold information designated for the cluster to which the data to be verified belongs.

The recognition apparatus acquires an input image including an object, and calculates a label indicating the object from the input image using a recognition model. For example, the object may be a face of a human. However, examples are not limited thereto. The label indicating the object is, for example, an ID of a human. The recognition apparatus recognizes the ID of the human more precisely in view of lighting and a pose of the object.

Figure 6:
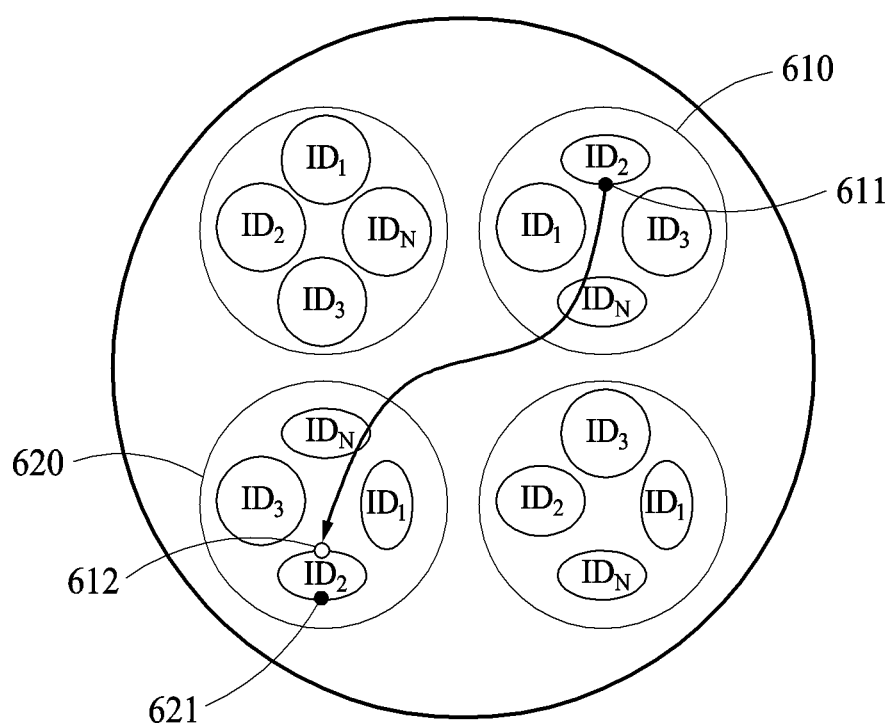
FIG. 6 is a diagram illustrating an example of verification in a case in which input data and registered data belong to different clusters in accordance with an embodiment.

FIG. 6 is a diagram illustrating an example of verification in a case in which input data and registered data belong to different clusters in accordance with an embodiment.

In a case in which a cluster 620 of registered data 621 is different from a cluster 610 of input data 611, a recognition apparatus calculates a similarity based on the clusters 610 and 620. FIG. 6 illustrates a feature space. The registered data 621 and the input data 611 are expressed as feature data within the feature space.

The recognition apparatus converts one of the registered data 621 and the input data 611 such that the registered data 621 and the input data 611 belong to the same cluster. For example, the recognition apparatus transfers the input data 611 to the cluster 620 to which the registered data 621 belongs. The recognition apparatus transfers the input data 611 to the cluster 620 of the registered data 621 by applying, to the input data 611, a cluster difference between cluster information, for example, a mean value, of the cluster 610 to which the input data 611 belongs and cluster information of the cluster 620 to which the registered data 621 belongs. The recognition apparatus generates converted data 612 by adding the cluster difference to the input data 611.

The recognition apparatus calculates a similarity between the data 612 converted by transferring the input data 611 to the cluster 620 of the registered data 621 and the registered data 621. Thus, although the input data 611 and the registered data 621 belong to different clusters, the recognition apparatus converts the two items of data 611 and 621 to the same cluster and performs recognition, thereby reflecting elements such as lighting, an environment, and a pose in a recognition result.

In response to the similarity between the converted data 612 and the registered data 621 exceeding threshold information designated for the cluster 620 to which the registered data 621 belongs, the recognition apparatus determines that the input data 611 matches the registered data 621. The threshold information will be described further with reference to FIG. 7.

Figure 7:
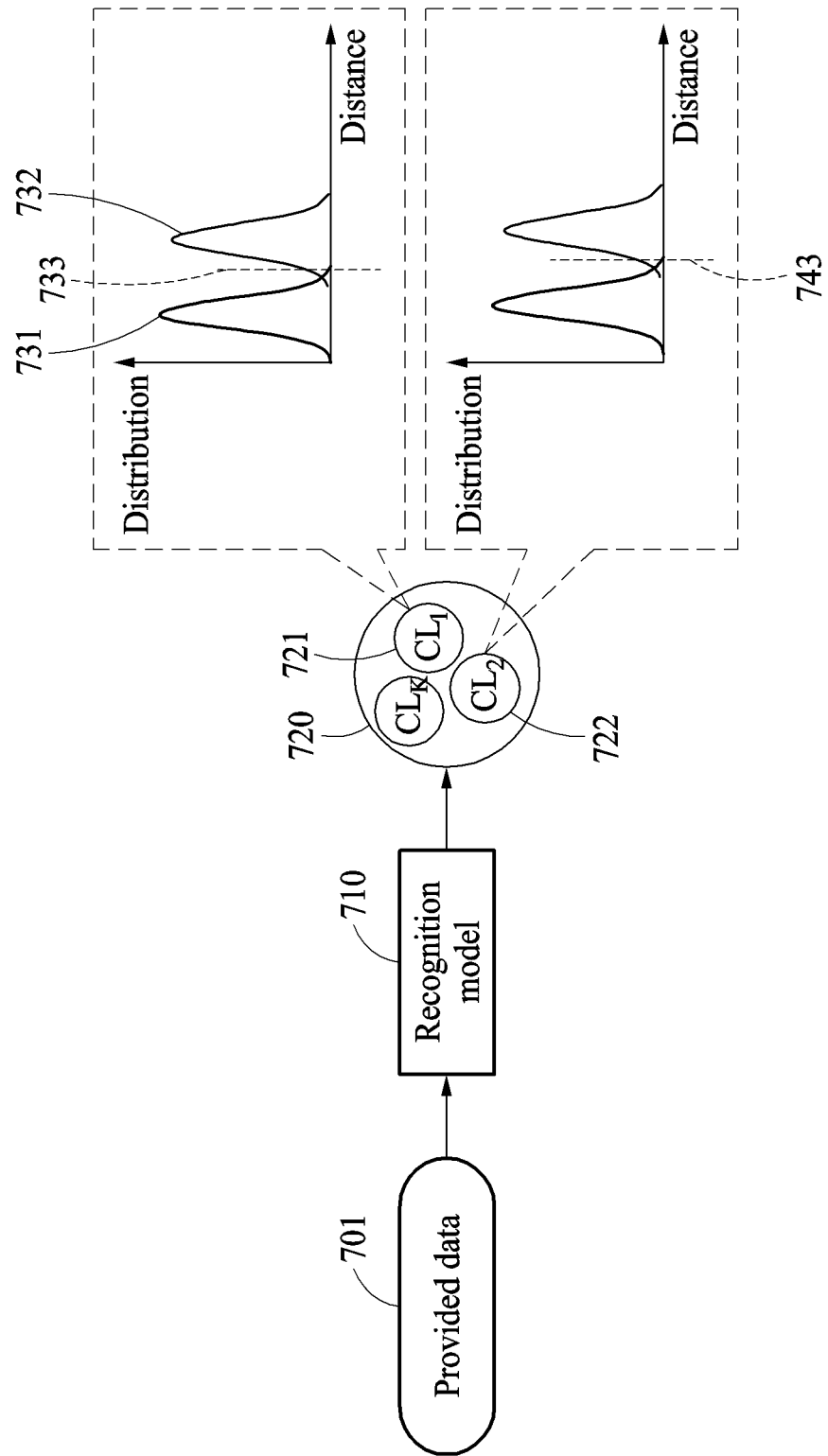
FIG. 7 is a diagram illustrating an example of designating threshold information for each cluster in accordance with an embodiment.

FIG. 7 is a diagram illustrating an example of designating threshold information for each cluster in accordance with an embodiment.

A training apparatus determines threshold information for each of a plurality of clusters. As described above, the training apparatus trains a recognition model 710 that forms a feature space 720 including K clusters including clusters 721 and 722.

Provided data 701 includes a data set having the same label and a data set having different labels in the same cluster. The data set having the same label is used to calculate a first similarity distribution 731, and the data set having different labels is used to calculate a second similarity distribution 732.

The training apparatus calculates a first similarity distribution between feature data belonging to a first sub-group within one of a plurality of clusters using the provided data 701 and the recognition model 710. Further, the training apparatus calculates a second similarity distribution between the feature data belonging to the first sub-group and feature data belonging to a second sub-group distinct from the first sub-group within the corresponding cluster using the provided data 701 and the recognition model 710. As shown in FIG. 7, the training apparatus calculates the first similarity distribution 731 and the second similarity distribution 732 with respect to the first cluster 721. In the first similarity distribution 731 and the second similarity distribution 732, a horizontal axis denotes a similarity, for example, a Euclidean distance, and a vertical axis denotes a similarity distribution, for example, the number.

The training apparatus determines threshold information with respect to the corresponding cluster based on the first similarity distribution and the second similarity distribution. As shown in FIG. 7, the training apparatus determines a similarity by which the first similarity distribution and the second similarity distribution are distinguished to be the threshold information. The training apparatus determines threshold information 733 separately for each cluster. Further, the training apparatus determines threshold information 743 with respect to the second cluster 722 to be a value different from that of the first cluster 721. In FIG. 7, a portion on the left of the threshold information 733, 743 corresponds to a data set having a label the same as that of a reference data set, and a portion on the right of the threshold information 733, 743 corresponds to a data set having a label different from that of the reference data set.

The training apparatus designates threshold information determined as described above for each cluster. A recognition apparatus determines, for each cluster, whether input data matches registered data based on the threshold information designated for each cluster.

Figure 8:
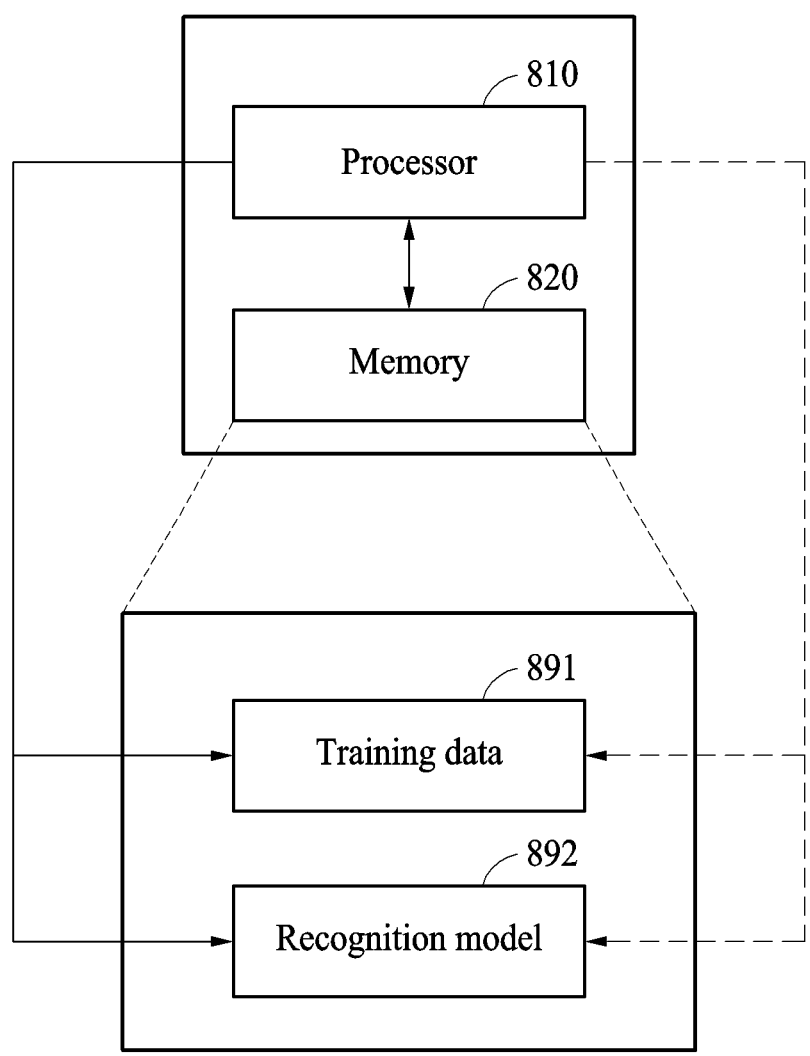
FIG. 8 is a block diagram illustrating an example of a configuration of a training apparatus in accordance with an embodiment.

FIG. 8 is a block diagram illustrating an example of a configuration of a training apparatus in accordance with an embodiment.

Referring to FIG. 8, a training apparatus 800 includes a processor 810 and a memory 820.

The processor 810 trains a recognition model 892 based on training data 891. The processor 810 trains the recognition model 892 to output a cluster and a training output from a training input of the training data 891.

The memory 820 stores the training data 891 and the recognition model 892. The training data may be locally stored in the memory 820 and/or obtained through communication hardware of the training apparatus 800.

Although the operations of the processor 810 and the memory 820 have been described here in brief, examples are not limited thereto. The processor 810 may be configured to perform one or more or all of the operations described with reference to FIGS. 1 through 7.

Figure 9:
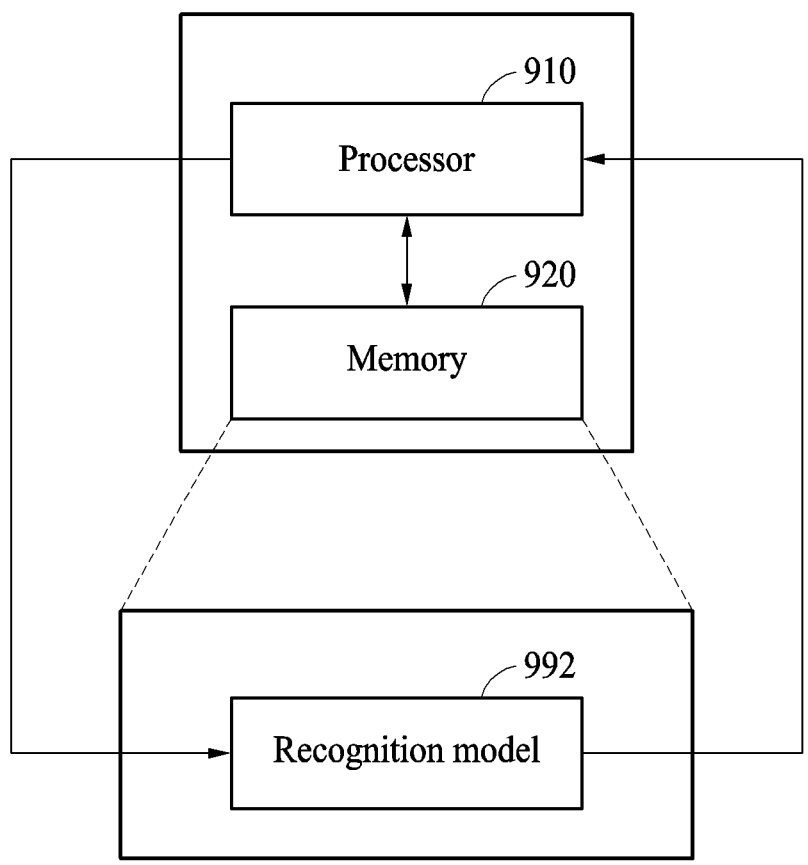
FIG. 9 is a block diagram illustrating an example of a configuration of a recognition apparatus in accordance with an embodiment.

FIG. 9 is a block diagram illustrating an example of a configuration of a recognition apparatus in accordance with an embodiment.

Referring to FIG. 9, a recognition apparatus 900 includes a processor 910 and a memory 920.

The memory 920 may store the recognition model 992. The recognition model 992 may be a model trained by the training apparatus of FIG. 8, for example, or the processor 910 may be configured to perform the training as discussed with respect to processor 810 of FIG. 8. In addition, the recognition model 992 may be stored in the memory 920 and/or obtained through communication hardware of the recognition apparatus 900. Upon receipt, the recognition apparatus 900 may then store the recognition model 992 in the memory 920. The recognition model 992 may also be updateable through relearning by the processor 910 or through receipt by the communication hardware of the recognition apparatus 900, such as for when the recognition model is trained for less, more, or different registered information.

The processor 910 calculates feature data and a cluster to which the feature data belongs from input data based on a recognition model 992. The processor 910 identifies one item of registered data matching the input data and/or verifies whether the input data matches data to be verified based on the calculated feature data and the cluster.

Although the operations of the processor 910 and the memory 920 have been described here in brief, examples are not limited thereto. The processor 810 may be configured to perform one or more or all of the operations described with reference to FIGS. 1 through 7.

In one or more embodiments, for example, the recognition apparatus 900 may recognize input data using the recognition model 992 reflecting clusters in view of an environment, such as low luminance or blur, and an object pose. Thus, in this example, the recognition apparatus 900 shows a relatively high recognition rate with respect to an image having various environments and various object poses.

The recognition apparatus 900 recognizes input images precisely with respect to different clusters, in addition to within the same cluster, based on threshold information designated for each cluster. In a case in which two images belong to the same cluster, it is indicated that the two images have similar environments or similar poses. In a case in which two images belong to different clusters, it is indicated that the two images have different environments or different poses.

The processor 910 of the recognition apparatus 900 calculates feature data corresponding to an input image including an object based on the recognition model from the input image. Here, the recognition apparatus 900 captures and acquires the input image through a camera, such as of the recognition apparatus 900. The object included in the input image may be a face of a human. However, examples are not limited thereto. The object may be an iris or a fingerprint, as non-limiting examples. The feature data is data representing features of the object, for example, features of a face of a human, an iris, and a fingerprint.

The processor 910 identifies a cluster to which the object included in the input image belongs based on the feature data.

The processor 910 determines a cluster corresponding to a pose of the object, among clusters corresponding to a plurality of object poses, based on the feature data. The object poses include a front face pose and a side face pose in a case in which the object is a face of a human. However, examples are not limited thereto.

In another example, the processor 910 determines a cluster corresponding to an ambient environment of the object, among clusters corresponding to a plurality of ambient environments, based on the feature data. The ambient environments include a first lighting environment, for example, an indoor environment, and a second lighting environment, for example, an outdoor environment. However, examples are not limited thereto.

The processor 910 recognizes the object based on the feature data and the cluster. The processor 910 recognizes a registered image matching the input image within the identified cluster. Here, the memory 920 of the recognition apparatus 900 includes a registration database, and the registration database includes a registered image corresponding to each cluster for each user ID, for example. In such an example, the registration database may include a registered image belonging to a cluster corresponding to each of the plurality of lighting environments and the plurality of object poses with respect to a user A.

However, examples are not limited thereto. The processor 910 may generate virtual registered images belonging to various clusters from a limited number of registered images and add the generated virtual registered images to the registration database during a registration process. For example, the processor 910 maps a cluster to which a registered image belongs to the registered image corresponding to a registered user and store the cluster to which the registered image belongs. The processor 910 generates and stores a virtual registered image corresponding to at least one of remaining clusters, excluding the cluster to which the registered image belongs.

Thus, such as in a case in which it is difficult to acquire images belonging to various clusters in an early stage, the recognition apparatus 900 may register a virtual registered image corresponding to another cluster from a registered image corresponding to a cluster.

The neural network 100, recognition model, first model, second model, third model, representative information excluder, training apparatus 800, processor 810, memory 820, recognition model 898, recognition apparatus 900, processor 910, memory 920, and recognition model 992 of FIGS. 1-9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented recognition method, comprising:
    calculating feature data corresponding to input data from the input data based on a recognition model, and identifying a cluster to which the input data belongs;
    recognizing the input data based on the feature data and the cluster to which the input data belongs; and
    in response to the cluster to which the input data belongs being different from a cluster to which data to be verified belongs,
        converting the input data to the cluster to which the data to be verified belongs by applying a cluster difference between the cluster to which the input data belongs and the cluster to which the data to be identified belongs, and
        recognizing the input data based on similarity between feature data of the converted input data and the feature data of the data to be verified exceeding a threshold.

2. The method of claim 1, wherein the input data is image data of a face, an iris, or a fingerprint, and the recognizing of the input data includes one or more of probabilistically identifying the input data from among registered information or verifying whether the input data corresponds to the registered information.

3. The method of claim 1, wherein the identifying of the cluster to which the input data belongs includes at least one of determining, as the cluster to which the input data belongs, a cluster corresponding to a pose of an object corresponding to the input data, among clusters corresponding to a plurality of object poses, or determining, as the cluster to which the input data belongs, a cluster corresponding to an ambient environment of the object corresponding to the input data, among clusters corresponding to a plurality of ambient environments.

4. The method of claim 1, further comprising training the recognition model by:
    grouping training data into a plurality of groups, the respective groups representing different identifications (IDs);
    excluding ID group representative information from group data belonging to each of the plurality of groups;
    clustering the group data from which the ID group representative information is excluded into a plurality of clusters; and
    grouping cluster data belonging to each of the plurality of clusters into a plurality of sub-groups, respective sub-groups of the plurality of sub-groups corresponding to the different IDs.

5. The method of claim 4, wherein the recognition model is a recognition model neural network, and the grouping of the training data trains, with supervision, a first model into the recognition model neural network, the clustering of the group data trains, without supervision, a second model into the recognition model neural network, and the grouping of the cluster data trains, with supervision, a third model into the recognition model neural network.

6. The method of claim 1, wherein the recognizing comprises verifying whether the input data matches registered data based on cluster information of the cluster to which the input data belongs and cluster information of the cluster to which the data to be verified belongs in response to the cluster to which the input data belongs being different from the cluster to which the data to be verified belongs.

7. The method of claim 1, wherein the recognizing comprises verifying whether the input data matches the data to be verified based on threshold information designated for the cluster to which the data to be verified belongs in response to the cluster to which the input data belongs being different from the cluster to which the data to be verified belongs.

8. The method of claim 1, wherein the recognizing comprises identifying registered data matching the input data, among items of registered data, based on the cluster to which the input data belongs and a cluster to which each of the items of registered data belongs.

9. The method of claim 8, wherein the identifying comprises:
sequentially selecting the data to be verified from the plurality of items of registered data; and
calculating a similarity between the feature data corresponding to the input data and the data to be verified based on cluster information of the cluster to which the input data belongs and cluster information of the cluster to which the data to be verified belongs in response to the cluster to which the input data belongs being different from the cluster to which the data to be verified belongs.

10. The method of claim 8, wherein the identifying comprises:
sequentially selecting data to be identified from the items of registered data; and
in response to the cluster to which the input data belongs being same as a cluster to which the data to be identified belongs, calculating a similarity between the feature data corresponding to the input data and the data to be identified.

11. The method of claim 1, further comprising:
storing cluster information for each of a plurality of clusters.

12. A non-transitory computer-readable medium storing instructions, that when executed by a processor, cause the processor to perform the method of claim 1.

13. The method of claim 1, wherein the transferring of the input data to the cluster to which the data to be verified belongs comprises converting the input data based on a cluster difference between the cluster to which the input data belongs and the cluster to which the data to be verified belongs.

14. A processor implemented training method to train a recognition model comprising a recognition model neural network, comprising:
grouping training data into a plurality of groups by training, with supervision, a first model into the recognition model neural network;
excluding group representative information from group data belonging to each of the plurality of groups;
clustering the group data from which the group representative information is excluded into a plurality of clusters by training, without supervision, a second model into the recognition model neural network; and
grouping cluster data belonging to each of the plurality of clusters into a plurality of sub-groups to train the recognition model by training, with supervision, a third model into the recognition model neural network.

15. The method of claim 14, wherein the grouping of the training data comprises grouping feature data calculated from a plurality of training inputs to which a same training output is mapped as a group corresponding to the training output, among the plurality of groups.

16. The method of claim 14, wherein the grouping of the training data comprises grouping a feature vector by training a first model to reduce an error between an output corresponding to the feature vector and a training output corresponding to a training input of the training data, the feature vector calculated using the first model from the training input.

17. The method of claim 14, wherein the excluding comprises:
calculating the group representative information for each of the plurality of groups; and
subtracting the group representative information from the group data belonging to each of the plurality of groups.

18. The method of claim 14, wherein the clustering comprises:
calculating cluster information for each of the plurality of clusters; and
mapping the cluster information to a corresponding cluster and storing the cluster information.

19. The method of claim 14, wherein the clustering comprises clustering the group data into the plurality of clusters by training a second model to reduce a cost calculated using the second model from the group data from which the group representative information is excluded.

20. The method of claim 14, wherein the grouping of the cluster data comprises grouping the cluster data into the plurality of sub-groups by training a third model to reduce an error between an output calculated using the third model from the cluster data belonging to each of the plurality of clusters and a training output corresponding to the cluster data.

21. The method of claim 14, further comprising:
determining threshold information for each of the plurality of clusters.

22. The method of claim 21, wherein the determining comprises:
calculating a first similarity distribution between feature data belonging to a first sub-group within one of the plurality of clusters;
calculating a second similarity distribution between the feature data belonging to the first sub-group and feature data belonging to a second sub-group distinct from the first sub-group within a corresponding cluster; and
determining the threshold information for the corresponding cluster based on the first similarity distribution and the second similarity distribution.

23. The method of claim 14, wherein the plurality of groups respectively correspond to different identifications (IDs), the excluded group representative information corresponds to respective ID information of each group data and is excluded from consideration during the clustering of the group data, and the grouping of the cluster data includes consideration of the respective ID information when grouping the cluster data so as to form sub-groups within each cluster.

24. The method of claim 14, further comprising recognizing input data based on calculated feature data corresponding to the input data using the trained recognition model and an identifying of a cluster to which the input data belongs.

25. A recognition apparatus, comprising:
a memory configured to store a recognition model; and
a processor configured to
calculate feature data corresponding to input data from the input data based on the recognition model,
identify a cluster to which the input data belongs, and
recognize the input data based on the feature data and the cluster to which the input data belongs, and
in response to the cluster to which the input data belongs being different from a cluster to which data to be verified belongs, the processor is further configured to
convert the input data to the cluster to which the data to be verified belongs by applying a cluster difference between the cluster to which the input data belongs and the cluster to which the data to be identified belongs, and recognize the input data based on similarity between feature data of the converted input data and the feature data of the data to be verified exceeding a threshold.

26. The recognition apparatus of claim 25, wherein the processor is further configured to train the recognition model using training data corresponding to registration data.

27. The recognition apparatus of claim 25, wherein the recognition model is a recognition model neural network, the recognition model neural network having been trained according to a grouping of training data into a plurality of groups to train, with supervision, a first model into the recognition model neural network, a clustering of group data belonging to each of the plurality of groups to train, without supervision, a second model into the recognition model neural network, and a grouping of cluster data belonging to each of the plurality of clusters into a plurality of sub-groups to train, with supervision, a third model into the recognition model neural network.

28. A processor implemented recognition method, comprising:

calculating feature data corresponding to an input image including an object based on a recognition model from the input image;

identifying a cluster to which the object included in the input image belongs based on the feature data, wherein the identifying comprises obtaining a cluster to which a registered image corresponding to a registered user belongs and obtaining a virtual registered image corresponding to at least one of remaining clusters excluding the cluster to which the registered image belongs; and recognizing the object based on the feature data, the cluster to which the object included in the input image belongs, and the virtual registered image.

29. The method of claim 28, wherein the identifying further comprises determining a cluster corresponding to a pose of the object, among clusters corresponding to a plurality of object poses, based on the feature data.

30. The method of claim 28, wherein the identifying further comprises determining a cluster corresponding to an ambient environment of the object, among clusters corresponding to a plurality of ambient environments, based on the feature data.

31. The method of claim 28, wherein the recognizing comprises recognizing a registered image matching the input image within the identified cluster.

* * * * *